United States Patent
Bither, Jr.

[15] 3,653,849
[45] Apr. 4, 1972

[54] COMPOUND $Pd_3P_2S_8$

[72] Inventor: Tom Allen Bither, Jr., Wilmington, Del.

[73] Assignee: E. I. du Pont de Nemours and Company, Wilmington, Del.

[22] Filed: Sept. 12, 1969

[21] Appl. No.: 857,561

[52] U.S. Cl..................................23/315, 23/50, 23/105, 23/114
[51] Int. Cl................C01b 25/00, C01b 17/00, C01g 55/00
[58] Field of Search............................................23/315, 105

[56] References Cited

OTHER PUBLICATIONS

Jolly, " The Synthesis And Characterization Of Inorganic Compounds," Pages 411– 420 (1970)
Chemical Abstracts, Vol. 43, Column 4170 (1949)
Van Wazer, " Phosphorus And Its Compounds," Volume I, pages 824– 826 (1958)

Primary Examiner—M. Weissman
Attorney—D. R. J. Boyd

[57] ABSTRACT

The compound $Pd_3P_2S_8$ in the form of crystals having trigonal symmetry can be made by heating together the appropriate elements of binary compounds thereof providing the atomic ratio of S to P is greater than unity. The compound is useful as a semiconductor and as a catalyst for the replacement of aromatic hydrogen with carbonyl chloride groups.

1 Claim, No Drawings

COMPOUND

FIELD OF THE INVENTION

This invention relates to novel semiconducting inorganic compounds and more particularly to semiconducting crystalline $Pd_3P_2S_8$.

BACKGROUND OF THE INVENTION

Ternary compounds of metals other than palladium with phosphorus and sulfur have been described in the literature, notably by L. Ferrand, Ann. Chim. Phys. (7), 17, 388 (1899) and by W. Klingen, G. Eulenberger, and H. Hahn, Naturwissenschaften, 55, 229 (1968), including the monoclinic isotypes $Fe_2P_2S_6$ and $Ni_2P_2S_6$. A distorted wurtzite-type compound, $Cu_3PS_4$, has been described by A. Ferrari and L. Cavalca, Gazz. Chim. Ital. 78, 283 (1948.). F. Hulliger, Nature 198, 382 (1963) has described some compounds of Periodic Table Group VIII metals with phosphorus and sulfur and predicted the existence of PdPS with metallic properties and the cubic, cobaltite-type crystal structure.

SUMMARY OF THE INVENTION

The compound of the present invention has the formula $Pd_3P_2S$. It is crystalline, has trigonal symmetry, contains one $Pd_3P_2S$ formula unit per unit cell, and has semiconducting properties.

DETAILED DESCRIPTION OF THE INVENTION

The new compound $Pd_3P_2S_8$ can be prepared by reaction of its component elements, optionally partially or entirely in the form of their binary compounds, at temperatures of 700°–1,300° C., preferably 800°–1,200° C., and at pressures ranging from autogenous to 25 kilobars. The mixture of elements or compounds employed in the synthesis must contain more than one atom of sulfur per atom of phosphorus. Otherwise, the ratio of palladium to phosphorus to sulfur in reactant mixtures is not critical, though atomic ratios of Pd:P:S falling within the range 1:0.5–1:1.33–3.5 are preferred.

Any of the allotropic forms of phosphorus and sulfur may be used as reactants. It is convenient, however, to employ commercially available, finely divided, pure forms of palladium, phosphorus, and sulfur. Suitable compounds that may be employed as reactants with, where indicated by stoichiometry, appropriate quantities of the elements include the palladium sulfides, e.g., PdS and $PdS_2$, the palladium phosphides, e.g., $PdP_2$ and $PdP_3$, and the phosphorus sulfides, e.g., $P_2S_5$, $P_4S_3$, $P_4S_7$, and $P_4S_5$.

By-products such as PdS, hydrolyzable phosphorus sulfide phases, and the new orthorhombic PdPS, described and claimed in my copending concurrently filed application Ser. No. 857,562, may also be formed in reactions yielding $Pd_3P_2S_8$. These by-products may be separated from $Pd_3P_2S_8$ by a variety of techniques, e.g., by mechanical separation by hand, by flotation, by dispersing by-products in a liquid and decanting the dispersed phase, by hydrolyzing water-soluble by-products, etc.

The formula of the new palladium-phosphorus-sulfur compound is $Pd_3P_2S_8$. Single crystal studies show that $Pd_3P_2S_8$ has trigonal symmetry. Chemical analyses, density determinations, and measured cell dimensions indicate that the unit cell consists of a single $Pd_3P_2S_8$ molecule. The composition $Pd_3P_2S_8$ appears to be unique with little or no range of stoichiometry, for unit cell dimensions were essentially the same regardless of the pressure of preparation over the range autogenous (i.e., less than 200 atmospheres) to 25 kilobars (kbars). $Pd_3P_2S_8$ may be prepared in any suitably inert reaction vessel capable of withstanding the pressure developed during reaction. Relatively fragile reaction vessels, e.g., quartz, may also be employed provided external pressure is applied to counterbalance the pressure developed internally. Sealed, evacuated quartz tubes may be used at temperatures up to at least 1,300° C. provided suitable external pressure is applied, e.g., 200 atmospheres of argon, to prevent rupture of the quartz reaction vessel by internal pressure developed during reaction. Pressure vessels in which the charged, evacuated, and sealed quartz tubes are placed may be heated internally or externally, e.g., by electrical resistance heating units. An especially useful type of pressure vessel was pressured with argon and equipped with an internal platinum heating unit. This vessel was capable of operation at pressures up to 3 kbars and temperatures up to 1,400° C.

Preparation at pressures greater than 3 kbars is conveniently effected by using a tetrahedral anvil pressure device of the sort described by E. C. Lloyd et al., Jour. of Res., National Bureau of Standards, 63C, 59 (1959). In this device, the reactants are placed in a boron nitride container which fits in a graphite sleeve that serves as a resistance heater. This assembly is enclosed in a pyrophyllite tetrahedron and is placed in the anvil device which is capable of generating pressures in excess of 65 kbars. The four calibration points used to determine pressure developed in this device appear in the 1963 edition of the American Institute of Physics Handbook, Part 4, p. 43, and are as follows:

| Bismuth I → II | $25.37 \pm 0.02$ kbars |
| Bismuth II → III | $26.96 \pm 0.18$ kbars |
| Thallium II → III | $36.69 \pm 0.11$ kbars |
| Barium II → III | $59.0 \pm 1.0$ kbars |

All compressions were made on the cold assembly and the charges were then heated to the desired temperature which was measured by an appropriate thermocouple. No pressure correction was made for thermocouple behavior, standard e.m.f. tables for 1 atmosphere being employed. The pressure unit is a bar, equivalent to $10^6$ dynes/cm$^2$. The larger unit, a kilobar, equal to 1,000 bars, is used herein.

Reaction pressures in the range from autogenous (less than 200 atmospheres) to 25 kbars have given products containing $Pd_3P_2S_8$ as one of the phases present. At pressures of 40 kbars or higher and temperatures of 600°–1,000° C., the $Pd_3P_2S_8$ phase was not observed to form.

The time of heating at maximum temperature is not critical. Two hours at maximum temperature is usually adequate, especially when the reaction period at maximum temperature is preferably followed by slow cooling to favor crystal growth. Slow cooling at 25°–200° C. per hour to about 400°–600° C. favors maximum crystal size. Rapid cooling, however, can also be employed if large crystals are not required.

A preferred method of carrying out the process of this invention involves mixing elementary palladium, phosphorus and sulfur in 1:1:3.25–3.5 atomic ratio, sealing the mixture in vacuo in a quartz tube, placing the sealed tube in an electrically heated pressure vessel, applying a back-up pressure of 200 atmospheres of argon, and heating to 900° C. in about 2 hours. The reaction mixture is held for 2 hours at 900° C, slowly cooled to about 600° C. in 3 hours, and then rapidly cooled to room temperature by discontinuing heating. The product is removed from the tube and extracted with warm water to remove hydrolyzable phosphorus sulfide impurities. The undissolved product consists of deep-red laminar platelets of $Pd_3P_2S_8$, usually containing only a trace of the orthorhombic PdPS phase as an impurity.

SPECIFIC EMBODIMENTS OF THE INVENTION

This invention is further illustrated by the following examples.

EXAMPLE 1

This example illustrates the preparation of $Pd_3P_2S_8$ at 1,200° C. and 3 kbars pressure, employing palladium, phosphorus, and sulfur in 1:1:3 atomic weight ratio.

A mixture of 0.266 g. of palladium, 0.078 g. of phosphorus, and 0.241 g. of sulfur in powder form was sealed off under vacuum in heavy-walled quartz tubing. The sealed tube was then heated for 2 hours at 1,200° C. under an external argon pressure of 3 kbars, slowly cooled in 4.5 hours to 400° C., and the heat was then turned off. The resultant product was a mixture of red-purple, yellow and black solids. The yellow solid was hydrolytically unstable and was removed by treatment with warm water. Following subsequent washing with acetone and drying in air, red-purple crystals containing a minor amount of black phase was obtained.

This product was essentially insoluble in such organic solvents as acetone, methanol, cyclohexanol, benzene, carbon disulfide, and carbon tetrachloride. The Debye-Scherrer X-ray diffraction powder pattern of this material, which very closely duplicated that described for the product of Example 2, could be indexed on the basis of a hexagonal unit cell with $a = 6.84$, $c = 7.24$ A. after deletion of nine weak reflections identified as originating from the minor black impurity phase.

EXAMPLE 2

This example illustrates the preparation of $Pd_3P_2S_8$ at 900° C. under autogenous pressure using palladium, phosphorus, and sulfur in 1:1:3 atomic weight ratio.

A mixture of 0.266 g. of palladium, 0.078 g. of phosphorus, and 0.241 g. of sulfur in powder form was sealed off under vacuum in quartz tubing. The sealed tube was heated for 2 hours at 900° C. under an external argon back-up pressure at 200 atmospheres, and then cooled in 3 hours to 600° C., whereupon heating was discontinued. The product consisted of a mixture of red-purple, orange, and some silvery crystals, the latter occurring both as platelets and as small parallelepipeds. The orange material was hydrolytically unstable and was removed by treatment with warm water, using ultrasonic vibration to disperse impurities. Following air-drying, red-purple crystals, many of which were in the form of hexagonal platelets, plus a small amount of the silvery crystals described above, were isolated.

X-ray precession photographs taken upon single crystals of the red-purple phase showed that it had trigonal symmetry (space group P321, P3m1, or P3̄m1) with hexagonal cell dimensions $a = 6.84$, $c = 7.24$ A. (unit cell vol. $= 294 A.^3$). The measured density of the crystals was 3.50 g./cm³. Elemental analysis showed the phosphorus content to be 9.90 percent. This unit cell volume, density, and phosphorus content are in good accord with the formula $Pd_3P_2S_8$, as determined on the product of Example 3, The following Debye-Scherrer X-ray diffraction powder pattern was obtained upon the red-purple crystals. Weak reflections, attributable to the silvery second phase, have been deleted. This powder pattern can be indexed on the basis of an hexagonal unit cell with $a = 6.836$, $c = 7.239A.$, in excellent agreement with the results of the single crystal X-ray measurements.

TABLE I

Diffraction Pattern of the Red-Purple, Crystalline $Pd_3P_2S_8$

| Intensity* | hkl | d Spacing, A. |
|---|---|---|
| 70 | 001 | 7.2279 |
| 50 | 100 | 5.9296 |
| 40 | 101 | 4.5858 |
| 10 | 002 | 3.6151 |
| 5 | 110 | 3.4341 |
| 85 | 111 | 3.0898 |
| 15 | 200 | 2.9602 |
| 100 | 201 | 2.7401 |
| 5 | 112 | 2.4810 |
| 5 | 003 | 2.4094 |
| 75 | 202 | 2.2908 |
| 15 | 103 | 2.2341 |
| 5 | 211 | 2.1380 |
| 30 | 212 | 1.9033 |
| 40 | 203 | 1.8697 |
| 25 | 220 | 1.7092 |
| 10 | 221 | 1.6630 |
| 15 | 213 | 1.6406 |
| 5 | 114 | 1.5989 |
| 35 | 204 | 1.5433 |
| 5 | 312 | 1.4919 |
| 10 | 005 | 1.4485 |
| 5 | 105 | 1.4058 |
| 5 | 223 | 1.3953 |
| 10 | 402 | 1.3689 |
| 5 | 320 | 1.3580 |
| 5 | 321 | 1.3350 |
| 5 | 322 | 1.2714 |
| 5 | 403 | 1.2626 |
| 2 | 224 | 1.2408 |
| 2 | 412 | 1.2175 |
| 5 | 404 | 1.1448 |
| 15 | 225 | 1.1050 |
| 5 | 422 | 1.0699 |
| 5 | 226 | 0.9858 |
| 2 | 430 | 0.9736 |
| 2 | 424 | 0.9508 |

*An intensity value of 100 is assigned to the strongest line of the pattern.

Four probe resistivity measurements on a single crystal of the red-purple $Pd_3P_2S_8$ showed it to be a semiconductor with resistivities $\rho_{279°K} = 7 \times 10^7$, $\rho_{300°K} = 4 \times 10^6$, and $\rho_{345°K} = 3 \times 10^4$ ohm-cm., and an activation energy of resistivity, $E_a \approx 1$ eV. A slight degree of photoconduction was also observed.

EXAMPLE 3

This example illustrates the preparation of $Pd_3P_2S_8$ at 900° C. and autogenous pressure employing palladium, phosphorus, and sulfur in 1:1:3.5 atomic weight ratio.

A mixture of 0.798 g. of palladium, 0.234 g. of phosphorus, and 0.843 g. of sulfur in powder form was sealed off under vacuum in quartz tubing and was heated in the manner and under the conditions described in Example 2. The resultant product was treated with water as in Example 2 and was then extracted with carbon disulfide to remove unreacted sulfur that might still be present. Red-purple crystals, essentially free of the silvery impurity noted in Example 2, were obtained.

Elemental analyses for Pd, P, and S indicated these to be present in the ratio Pd:P:S = 3.00:1.94:7.95, which within limits of experimental error corresponds to $Pd_3P_2S_8$. A measured density of 3.57 g./cm³ was obtained upon other crystals of this $Pd_3P_2S_8$ phase prepared at the same time. From the volume of the hexagonal unit cell of this material ($284A.^3$ — see Example 2), its molecular weight (637.7), and the above measured density (3.57 g./cm³), 1 formula weight per unit cell is indicated, i.e., $n_{calc.} = 0.99$ (see "Introduction to Solids," L. V. Azaroff, McGraw-Hill, 1960, pp. 53–54).

An additional lot of red-purple crystals of $Pd_3P_2S_8$ was prepared and purified in the same manner as above. The Debye-Scherrer X-ray diffraction powder pattern of this material was the same as that of the product of Example 2.

The optical transmission of $Pd_3P_2S_8$ was measured upon a flat platelet about 25 microns in thickness, and a band edge near a wavelength of 0.55 micron was observed, indicating an optical ban gap, $\Delta E$, of about 2.2 eV. This measurement is in excellent agreement with the activation energy of resistivity, $E_a \approx 1$ eV, reported in Example 2 ($E_a$ is identical to $\Delta E/2$). At longer wavelengths, the sample was observed to be transparent up to a wavelength of 1.5 microns, the termination of the measurement.

Magnetic susceptibility measurements indicated that $Pd_3P_2S_8$ was diamagnetic.

EXAMPLE 4

This example illustrates the preparation of $Pd_3P_2S_8$ at 900° C. and autogenous pressure using palladium, phosphorus, and sulfur in 1:1:2.5 atomic weight ratio.

A mixture of 0.532 g. of palladium, 0.156 g. of phosphorus, and 0.402 g. of sulfur in powder form was sealed under vacuum in quartz tubing and heated in the manner and under the conditions described in Example 2. The resulting product was purified in water as in Example 2, and a mixture of red-purple crystals of $Pd_3P_2S_8$ plus silvery PdPS was obtained.

Crystals of $Pd_3P_2S_8$ were separated and heated under an atmosphere of argon in a differential thermal analyzer. Under these conditions, $Pd_3P_2S_8$ was stable to about 730° C., at which temperature heat was absorbed and decomposition occurred. In an atmosphere of oxygen, oxidation commenced at a temperature of about 450° C.

EXAMPLE 5

This example illustrates the preparation of $Pd_3P_2S_8$ at 1,000° C. and 20 kbars pressure, employing palladium, phosphorus, and sulfur in 1:1:1.5 atomic weight ratio.

A 0.537 g. pellet from a mixture of 1.170 g. of palladium, 0.341 g. of phosphorus, and 0.529 g. of sulfur was pressured to 20 kbars and heated for 2 hours at 1,000° C. in the tetrahedral anvil, cooled in 4 hours to 400° C., and quenched to room temperature. A mixture of red crystals and silvery PdPS crystals was isolated from the center of the product and was washed with water. The Debye-Scherrer X-ray diffraction powder pattern of the red crystals was the same as that of the product of Example 2, indicating them to be $Pd_3P_2S_8$.

EXAMPLE 6

This example illustrates the preparation of $Pd_3P_2S_8$ at 800° C. and 25 kbars pressure, employing palladium, phosphorus, and sulfur in 1:1:3 atomic weight ratio.

A 0.451 g. pellet from a mixture of 1.580 g. of palladium, 0.460 g. of phosphorus, and 1.430 g. of sulfur was pressured to 25 kbars in the tetrahedral anvil and heated for 2 hours at 800° C., slowly cooled for 4 hours to 400° C., and quenched to room temperature. A mixture of red crystals and silvery PdPS crystals plus some amorphous blue-black material was obtained. Hydrolyzable impurities were extracted with water. The Debye-Scherrer X-ray diffraction powder pattern of the red crystals was the same as that of the product of Example 2, showing them to be $Pd_3P_2S_8$.

EXAMPLE 7

This example illustrates the preparation of $Pd_3P_2S_8$ at 1,000° C. and 25 kbars pressure, using palladium, phosphorus, and sulphur in 1:0.67:1.33 atomic weight ratio.

A 0.573 g. pellet from a mixture of 1.277 g. of palladium, 0.248 g. of phosphorus, and 0.513 g. of sulfur was reacted in the tetrahedral anvil in the manner of Example 5 but at a pressure of 25 kbars. A mixture of red crystals plus silvery crystals of PdPS as well as PdS was produced. Hydrolyzable impurities were extracted with water. The Debye-Scherrer X-ray diffraction powder pattern of the red crystals was identical to that of the product of Example 2, indicating them to be $Pd_3P_2S_8$.

As described in Example 2, $Pd_3P_2S_8$ exhibits semiconducting properties and has an optical band gap (Example 3) in the visible region of the spectrum. Thus, it may be incorporated as one or more of the electrical components of solid state devices which, for example, may be used as transistors, thermistors, rectifiers, diodes, photoconductors, and detectors or emitters of radiation.

The compound $Pd_3P_2S_8$ is also useful as a catalyst, for example, in reactions involving the replacement of aromatic hydrogen with halocarbonyl, thus leading to the formation of acyl halides. This use is illustrated in Example A below.

EXAMPLE A

Benzene (44 g.) and phosgene (40 g.) were heated for 4 hours at 300° C. in a Hastelloy C pressure reactor under 600 atmospheres of carbon monoxide pressure in the presence of catalytic quantities (0.3 g.) of $Pd_3P_2S_8$ prepared as described in Example 2. Reaction took place with 100 percent yield and 100 percent conversion based on phosgene, affording, as determined by gas chromatography, 96.8 percent benzoyl chloride, 2.3 percent phthaloyl chloride, 0.6 percent chlorobenzoyl chloride, and 0.3 percent chlorobenzene by weight. The quantity of hydrogen chloride produced in the reaction was not determined. None of the foregoing products were obtained when under the same conditions, $Ni_2P_2S_6$ was substituted for $Pd_3P_2S_8$.

The embodiments of the invention in which an exclusive property or privilege is claimed are defined as follows:

1. The compound having the formula $$Pd_3P_2S_8$$

characterized by trigonal crystal symmetry, semiconducting properties, and having an X-ray diffraction pattern as shown in Table I.

* * * * *